UNITED STATES PATENT OFFICE 2,373,419

POLYMERIZED ACYCLIC TERPENES AND METHOD OF PRODUCTION

Alfred L. Rummelsburg, Wilmington, Del., assignor to Hercules Powder Company, Wilmington, Del., a corporation of Delaware No Drawing. Application May 31, 1941, Serial No. 396,212

14 Claims. (Cl. 260—92.6)

This invention relates to the polymerization of acyclic terpenes having three double bonds per molecule and to the products formed thereby. More particularly, it relates to an improved method of polymerizing such acyclic terpenes whereby an improved product is obtained.

Heretofore, it has been known to polymerize allo-ocimene in the presence of a sulfuric acid or sulfuric acid-acetic acid catalyst. The resultant product is a brown liquid resin which analysis shows to be composed substantially entirely of the dimer. There are difficulties inherent in such a process, however. When sulfuric acid is used in the reaction, there is always an attendant charring of the allo-ocimene or its polymers. This in turn results in a product dark in color and in reduced yield. Furthermore, sulfuric acid is a strong sulfonating agent. Consequently, when it is used to promote polymerization, the collateral process of sulfonation takes place which further reduces the yield.

This invention has an object to provide an improved process for the polymerization of acyclic terpenes having three double bonds per molecule.

Another object is to provide a process for the production of an improved polymer of an acyclic terpene having three double bonds per molecule.

A further object is to provide a process for the production of an improved polymer of an acyclic terpene having three double bonds per molecule, which polymer contains a substantial quantity of polymeric constituents higher than the dimer.

It is a further object to provide an improved process for the polymerization of allo-ocimene and to provide improved products as a result thereof.

Other objects will appear hereinafter.

These objects are, in general, accomplished by polymerizing an acyclic terpene having three double bonds per molecule, in the presence of a metal halide catalyst. It has been found that when allo-ocimene, for example, is brought into contact with a metal halide catalyst, polymerization takes place without any attendant charring or sulfonation. It has further been found that, by using particular metal halide catalysts and by suitably controlling the reaction, it is possible to secure a variety of polymers which have never before been obtained. These new products are solids which contain a substantial quantity of polymers higher than the dimer.

In accordance with this invention, there may be employed as the starting material any acyclic terpene of the empirical formula $C_{10}H_{16}$, having three double bonds per molecule. Thus, allo-ocimene, ocimene or myrcene may be employed. In particular, it is preferred to employ allo-ocimene. This terpene, in addition to having a system of three double bonds, has them in a triply conjugated arrangement. Hereinafter, in this specification, an acyclic terpene having three double bonds per molecule will be referred to, for convenience, merely as an acyclic terpene.

The processes of my invention comprise effecting polymerization of an acyclic terpene in the presence of a metal halide catalyst. The acyclic terpene may be used by itself or dissolved in a suitable solvent. Desirably, however, the polymerization is carried out with the acyclic terpene dissolved in an inert, volatile, organic solvent. Examples of such solvents are: aromatic hydrocarbons, as benzene, xylene, etc.; aliphatic hydrocarbons, as butane, gasoline, cyclohexane, decahydronaphthalene, petroleum ether, V. M. & P. naphtha, hydrogenated petroleum naphtha, cymene, etc.; esters, as methyl acetate, ethyl acetate, etc.; and halogenated hydrocarbons, as chloroform, ethylene dichloride, ethyl chloride, carbon tetrachloride, trichloroethylene, tetrachloroethane, pentachloroethane, propylene dichloride, monochlorobenzene, etc. Although any of the aforesaid inert solvents are satisfactory for use in this invention, a halogenated solvent should preferably be used when the objective is the production of solid polymers. Of these halogenated solvents, preferably one with at least one hydrogen atom in the compound, for example, ethylene dichloride, ethyl chloride, trichloroethylene, fluoro dichloromethane, difluoro chloromethane, tetrachloroethane, pentachloroethane, propylene dichloride, etc., should be used. When a solvent is used, the concentration of the acyclic terpene in the solvent may vary widely but will preferably be within the range of from about 10% to about 75% of the weight of the solution.

The catalyst may be incorporated in the above solution either by dispersion or by dissolution. Furthermore, either the dispersion or the dissolution may be attained by dissolving the acyclic terpene in a suitable solvent and then adding the catalyst. Alternatively, the catalyst may be first dissolved or dispersed in a solvent and the acyclic terpene then added.

In carrying out the processes of this invention, a metal halide is employed as the polymerization catalyst. For example, metal chlorides, preferably anhydrous, such as, zinc chloride, stannic chloride, aluminum chloride, titanium chloride, ferric chloride, etc.; metal fluorides, such as, boron trifluoride and its molecular complexes with ethers and acids, sodium hydrofluoride, aluminum fluoride, etc.; metal bromides, such as, aluminum bromide, stannic bromide, ferric bromide, etc., etc. Varying amounts of catalyst may be used; however, it is preferred to use not more than about 25% by weight of catalyst based on the amount of acyclic terpene used. It is still more preferable to use an amount of catalyst within the range of from about 1% to about 10% based on the amount of acyclic terpene used.

The polymerization inherent in the invention may be carried out over wide ranges of temperature. It is preferable to use a temperature within the range of from about −35° C. to about 200° C., and still more preferable to use a temperature within the range of from about −5° C. to about 75° C. Where low boiling solvents are employed, it is convenient to use temperatures at or below the reflux temperature of the reaction mixture.

In carrying out the invention as broadly described, quite different products result depending upon the particular catalyst used and the conditions of the reaction. For example, when a metal chloride, and preferably aluminum chloride, is used, generally solid polymers result. These solid polymers are formed when the reaction is carried out over wide ranges of temperature and using various inert solvents. Preferably, however, to form solid polymers the reaction is carried out at a temperature within the range of from about −35° C. to about 60° C. with the acyclic terpene dissolved in a halogenated organic solvent, such as, ethylene chloride, ethyl chloride, etc.

The various products obtained in carrying out the processes hereinbefore described may be purified in any suitable manner. The catalyst may be removed by washing the reaction mixture with water. Removal of the catalyst is sometimes facilitated by washing with solutions of aqueous acids, such as, aqueous $H_2SO_4$, HCl, etc. The concentration of the acid in the aqueous wash solution may vary from about 5% to about 25% or more. Following the wash with aqueous acid, the reaction mixture is washed with water to remove any acid present. Then, it will often be found advantageous to filter the mixture to remove traces of dispersed metal hydroxides and catalyst-polymer complexes. An adsorbent such as kieselguhr, fuller's earth, filter-cel, silica gel, activated carbon, etc., may be used during the filtration step. Finally, the solvent, if one has been used, and any unpolymerized material may be removed, desirably by steam or vacuo distillation, etc.

Alternative procedures in the purification may comprise washing the reaction mixture with solutions of aqueous alkalies. Particularly when solid polymers are being produced, it may be desirable, after the reaction mixture has been treated to remove the catalyst, etc. as outlined above, to precipitate the solid polymers by adding the mixture to an excess of alcohol, such as methyl, ethyl, etc. alcohols. The solid polymers may be filtered from the liquid, washed with additional alcohol and thereafter dried.

The solid polymers which are prepared by the processes above described contain substantial quantities of polymeric constituents higher than the dimer. It has been determined that these organic solids have at least about 70% of polymeric constituents higher than the dimer. They are further characterized by having lower thiocyanate values than the liquid polymers, the values for the former falling within the range of from about 20 to about 80. The liquid polymers prepared from a substantially pure acyclic terpene have a thiocyanate value within the range of from about 120 to 240 and are more unsaturated than the previously prepared terpene polymers, such as, polymerized pinene, or dipentene, etc. which polymers generally have a thiocyanate value between about 80 and about 100.

It will be understood that in carrying out the invention in its broadest aspects the acyclic terpene may be used in a substantially pure state or in an admixture with other terpenes which admixture, however, contains substantial quantities of a desired acyclic terpene. The other terpenes may or may not polymerize in the reaction depending upon their nature. Thus, for example, an impure allo-ocimene to which my invention may be applied is that obtained by the pyrolysis of α-pinene. It has been found that when α-pinene is pyrolyzed under suitable conditions of temperature and contact time of the vapor with the reaction tube, there is produced a substantial quantity of allo-ocimene, in addition to dipentene and other complex terpenes in quantities determined by the conditions of the reaction. For further detail, see application for U. S. Letters Patent by A. L. Rummelsburg, Serial No. 368,364, filed December 3, 1940. In addition, it is possible by suitable pyrolysis of β-pinene at say 400° C. to obtain terpene mixtures containing as much as 67% myrcene. Such a mixture may also be subjected to conditions of polymerization in accordance with this invention.

The present process may be carried out either continuousy or by the batch method. In the continuous process, a mixture of the catalyst, inert solvent and acyclic terpene is fed through a coil of pipe where it is held at a desired temperature. The rate of feed is governed in such a manner that the reaction is substantially complete by the time the mixture reaches the end of this coil of pipe. The mixture then flows into an enlarged chamber where it is washed with water or treated in some other manner as described above to remove the catalyst. The material is filtered and introduced into a still which is advantageously maintained under reduced pressure and the solvent and volatile reactants distilled from the residue which collects in the lower portion of the still.

Below are given several examples showing typical methods of carrying out the principles of the present invention. All parts and percentages are by weight unless otherwise stated.

*Example 1*

Three hundred parts of 97% allo-ocimene were dissolved in 400 parts of ethyl chloride and the solution cooled to −20° C. To this solution were added 2 parts of aluminum chloride which dissolved readily on vigorous agitation at about 0° C. A further quantity of 8 parts of aluminum chloride was added slowly at 0° C. with vigorous agitation after which the solution was held at a temperature of −10° C. to −20° C. for 1 hour and subsequently at −35° C. for 3 hours. Precipitation with 1000 cc. of ethyl alcohol in which the polymeric constituents were insoluble, followed by an alcohol wash, yielded a polymeric residue. This was dissolved in benzene and thereafter washed with dilute HCl and water. Evaporation of the benzene left 250 parts of a pale colored solid polymer having a drop melting point of 110° C., a thiocyanate value of 50 and a color of WG on the rosin scale.

Example 2

Using a process similar to that of Example 1, with a two-fold increase in the amount of ethyl chloride, the temperature of the mixture was held at −70° C. for 2½ hours after the catalyst had been added. The polymer was precipitated by adding ethyl alcohol. A pale colored solid product resulted having a drop melting point of 70° C. and a thiocyanate value of 60.

Example 3

One hundred parts of 95% allo-ocimene were dissolved in 200 parts of benzene. Ten parts of boron trifluoride-ether complex containing 45% boron trifluoride were added with agitation and cooling at 10° C. The reaction mixture was allowed to stand for about 24 hours at 20° C. to 30° C. The reaction mixture was water washed, and the solvent removed by vacuo distillation. About 80 parts of polymeric residue remained. It was a viscous oil with a thiocyanate number of 140.

Example 4

An impure allo-ocimene was obtained by pyrolyzing α-pinene at a temperature of 380° C. to 400° C. This product contained 40% allo-ocimene in addition to other terpenes, such as dipentene, α-pinene, etc. To 50 parts of said mixture were added 125 parts of ethylene dichloride. Slowly 1 part of stannic chloride was added to the mixture with cooling and agitation at 10° C. The temperature was then lowered to 0° C. and held there for 20 hours. The mixture was washed with water to remove the stannic chloride and the solvent removed by steam distillation. The product was obtained in 80% yield and was a viscous oil. It had a drop melting point of 45° C. and a thiocyanate value of 80.

Example 5

To 50 parts of the same allo-ocimene as was used in Example 4, were added 125 parts of ethylene dichloride. Slowly 1 part of boron trifluoride-acetic acid complex containing about 33% BF₃ was added to the allo-ocimene with cooling and agitation at 10° C. After standing at 0° C. for about 20 hours, the reaction mixture was water washed and the solvent removed by steam distillation. The product was obtained in 90% yield and was a viscous oil. It had a drop melting point of 40° C. and a thiocyanate value of 90.

Example 6

One hundred and forty parts of anhydrous aluminum chloride were added with stirring to 1250 parts of ethylene dichloride. The solution was cooled to 2° C. and 750 parts of the same allo-ocimene as used in Example 4 were added with vigorous agitation and cooling to a temperature of from 18–21° C. during a period of 2 hours. Agitation was continued at 18° C. for ½ hour and then ice and water added with stirring and further cooling to remove the aluminum chloride. After filtering and water washing, the solvent was removed by steam distillation. There was obtained 650 parts of a resinous solid which had a drop melting point of 84° C., a thiocyanate value of 38.5 and a color of G on the rosin scale.

Example 7

Duplication of the process of Example 5, with the exception that the ethylene dichloride was replaced by toluene, gave a resin having a drop melting point of 70° C. and a thiocyanate value of 70 as the product in about 90% yield.

The processes of this invention are definite improvements over the prior art in that it is possible by their use to polymerize an acyclic terpene without charring or sulfonating the reactants or the product. At the same time there is obtained a higher yield of product.

The novel solid polymers produced by virtue of this invention have a variety of uses. Incorporated in varnishes, they give superior light resistance to that of ester gum varnishes. The durability of a varnish film containing such a polymer is much better than that of an ester gum varnish film. Also the water resistance of the new varnish is superior to that of ester gum varnishes. The solid polymers are apparently more saturated than the liquid polymers and may be efficiently used as resins in protective coatings since they impart "non-tack" properties.

The liquid polymers produced by virtue of this invention, particularly those obtained when a substantially pure acyclic terpene is used, are much more unsaturated than many of the other liquid polyterpenes, such as, liquid polydipentene, "dipolymer," liquid polypinene, etc. Hence, they react more readily with many other compounds. For example, maleic anhydride will react with these polymers, and the resulting product may be further esterified with mono- and polyhydric alcohols. The products are resins which may be incorporated in protective coatings. Phenol may also be reacted with these liquid polymers and that product in turn reacted with formaldehyde to form resins which are soluble in drying oils. Further, these polymers may be sulfonated to yield products having sudsing and wetting out properties in aqueous solution.

It will be understood that the details and examples hereinbefore set forth are illustrative only and that the invention as broadly described and claimed is in no way limited thereby.

This application is a continuation-in-part of my application for United States Letters Patent, Serial No. 370,664, filed December 18, 1940.

What I claim and desire to protect by Letters Patent is:

1. The process of polymerizing an acyclic terpene, having three double bonds per molecule, which comprises contacting said acyclic terpene in liquid phase with a stannic chloride catalyst at a temperature within the range of from about −35° C. to about 200° C.

2. The process of polymerizing an acyclic terpene, having three double bonds per molecule, which comprises contacting said acyclic terpene in liquid phase with an aluminum chloride catalyst at a temperature within the range of from about −35° C. to about 200° C.

3. The process of polymerizing an acyclic terpene, having three double bonds per molecule, which comprises contacting said acyclic terpene in liquid phase with a boron trifluoride catalyst at a temperature within the range of from about −35° C. to about 200° C.

4. The process of polymerizing allo-ocimene which comprises contacting alo-ocimene in liquid phase with a stannic chloride catalyst at a temperature within the range of from about −5° C. to about 75° C.

5. The process of polymerizing allo-ocimene which comprises contacting allo-ocimene in liquid phase with an aluminum chloride catalyst at a temperature within the range of from about −5° C. to about 75° C.

6. The process of polymerizing allo-ocimene which comprises contacting allo-ocimene in liquid phase with a boron trifluoride catalyst at a temperature within the range of from about −5° C. to about 75° C.

7. The process of polymerizing allo-ocimene, dissolved in a halogenated organic solvent, which comprises contacting the resulting solution with a stannic chloride catalyst at a temperature within the range of from about −5° C. to about 75° C.

8. The process of polymerizing allo-ocimene, dissolved in a halogenated organic solvent, which comprises contacting the resulting solution with an aluminum chloride catalyst at a temperature within the range of from about −5° C. to about 75° C.

9. The process of polymerizing allo-ocimene, dissolved in a halogenated organic solvent, which comprises contacting the resulting solution with a boron trifluoride catalyst at a temperature within the range of from about −5° C. to about 75° C.

10. As a new composition of matter, a solid polymerized allo-ocimene containing at least 70% of polymers higher than the dimer.

11. As a new composition of matter, a solid polymerized ociment containing at least 70% of polymers higher than the dimer.

12. As a new composition of matter, a solid polymerized allo-ocimene containing at least 70% of polymers higher than the dimer characterized by its having a thiocyanate value within the range of from about 20 to about 80.

13. The process of polymerizing an acyclic terpene having three double bonds per molecule, which comprises contacting said material in liquid phase at a temperature between about −35° C. to about 200° C. with an effective amount of a metal halide catalyst capable of polymerizing the terpene to a polymer containing at least about 70% of polymers higher than the dimer.

14. The process of polymerizing allo-ocimene which comprises contacting allo-ocimene in liquid phase at a temperature between about −35° C. and about 200° C. with an effective amount of a metal halide catalyst capable of polymerizing the terpene to a polymer containing at least about 70% of polymers higher than the dimer.

ALFRED L. RUMMELSBURG.